United States Patent
Gunzert et al.

(10) Patent No.: US 9,898,925 B2
(45) Date of Patent: Feb. 20, 2018

(54) METHOD FOR OPERATING A FIELD DEVICE

(71) Applicant: CodeWrights GmbH, Karlsruhe (DE)

(72) Inventors: Michael Gunzert, Herxheim (DE); Michael Maneval, Schopfheim (DE); Ralf Schmidt, Kembs (FR); Johannes Sprenger, Lorrach (DE)

(73) Assignee: CodeWrights GmbH, Karlsruhe (DE)

( * ) Notice: Subject to any disclaimer, the term of this patent is extended or adjusted under 35 U.S.C. 154(b) by 27 days.

(21) Appl. No.: 14/547,397

(22) Filed: Nov. 19, 2014

(65) Prior Publication Data

US 2015/0145654 A1    May 28, 2015

(30) Foreign Application Priority Data

Nov. 26, 2013 (DE) .................. 10 2013 113 037

(51) Int. Cl.
 *G08C 17/02* (2006.01)
 *G05B 19/042* (2006.01)
 *G05B 19/418* (2006.01)

(52) U.S. Cl.
 CPC .......... *G08C 17/02* (2013.01); *G05B 19/042* (2013.01); *G05B 19/4183* (2013.01); *Y02P 90/10* (2015.11)

(58) Field of Classification Search
 CPC .. G08C 17/02; G05B 19/042; G05B 19/4183; Y02P 90/10
 See application file for complete search history.

(56) References Cited

U.S. PATENT DOCUMENTS

| | | |
|---|---|---|
| 9,134,151 B2 | 9/2015 | Robl |
| 9,529,351 B2 | 12/2016 | Ismail |
| 2015/0018996 A1* | 1/2015 | Furihata ............... G05B 19/042 700/108 |

FOREIGN PATENT DOCUMENTS

| | | |
|---|---|---|
| CN | 102782453 A | 11/2012 |
| DE | 102004019253 A1 | 11/2005 |
| DE | 102005060049 A1 | 6/2007 |
| DE | 102007026457 A1 | 12/2008 |
| DE | 102010027963 A1 | 10/2011 |
| DE | 102011084789 A1 | 4/2013 |
| EP | 1798620 A1 | 6/2007 |
| WO | 2005101149 A2 | 10/2005 |
| WO | 2013004384 A1 | 1/2013 |

OTHER PUBLICATIONS

German Search Report, German PTO, Munich, dated Jun. 26, 2014.

* cited by examiner

*Primary Examiner* — Long Pham
(74) *Attorney, Agent, or Firm* — Bacon & Thomas, PLLC

(57) ABSTRACT

A method for operating a field device, wherein at least one command that is in line with a communication protocol for operating a field device is sent from a higher-order unit to a field device by sending the command to an operating unit by means of a first bearer protocol and by transmitting the command from the operating unit to the field device by means of a second bearer protocol.

16 Claims, 1 Drawing Sheet

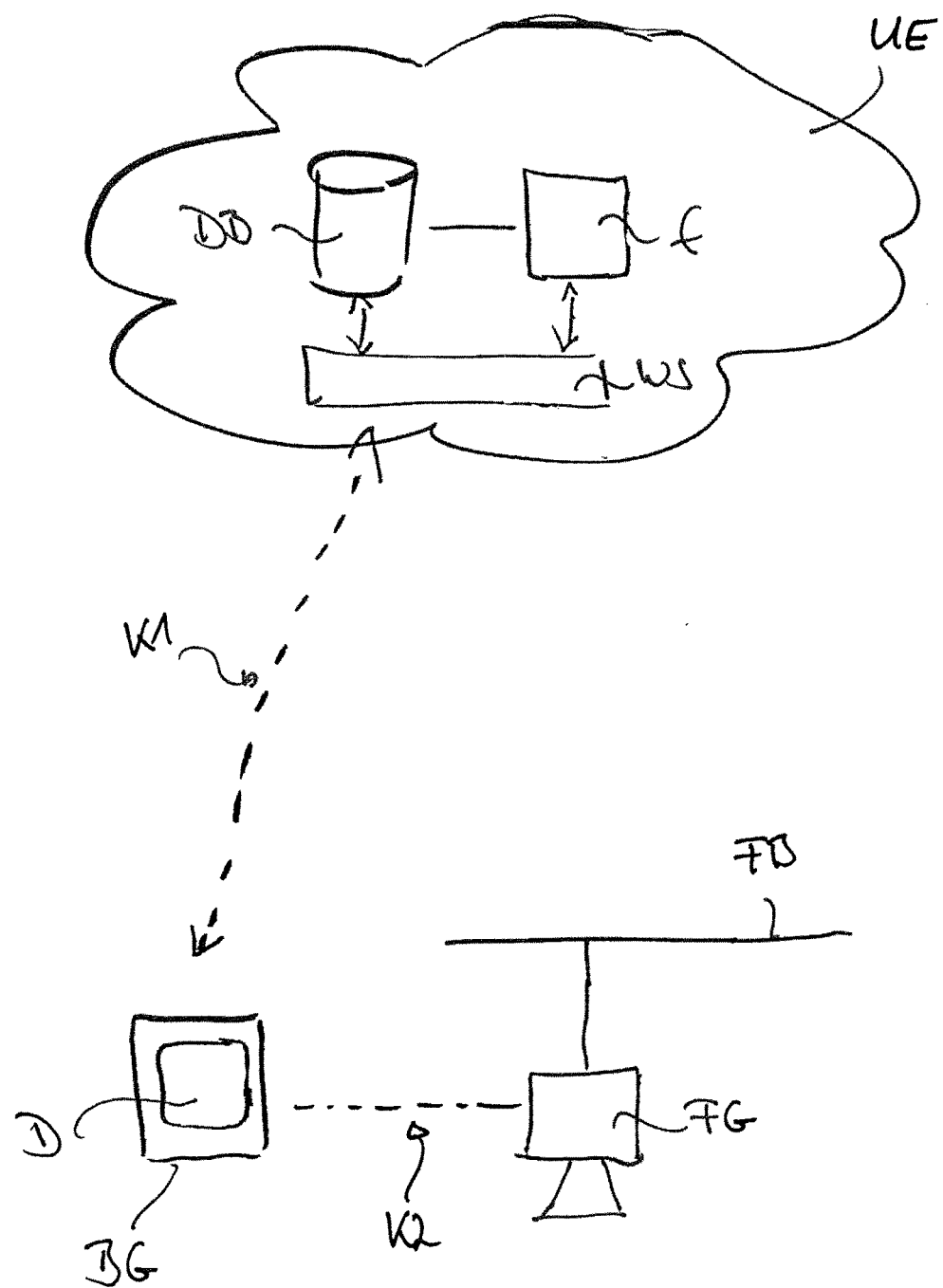

METHOD FOR OPERATING A FIELD DEVICE

TECHNICAL FIELD

The invention refers to a method for operating a field device, an arrangement comprising a higher-order unit, an operating device and a field device. Furthermore, the invention refers to a client application and a server application.

BACKGROUND DISCUSSION

Programs for the operation of field devices, such as FieldCare, are known from the prior art. FieldCare, for instance, runs on a computer, such as a laptop, and uses one or more device type managers (DTMs) to operate a field device. To this end, a DTM that is specific for the field device can be provided, said DTM describing the functions of a particular field device. Further to this, a COM-DTM can also be provided which is used to communicate with the field device as defined in the specific fieldbus protocol which the field device has.

Nowadays, field devices have communication interfaces to be able to communicate over a fieldbus using a specific protocol. Examples of such types of fieldbus protocols include HART, FoundationFieldbus or Profibus. Field devices usually only have one protocol by means of which they can be operated. In such cases, in particular, there is often only one communication stack in the field device by means of said communication stack the field device can communicate. A communication connection is then always established by means of the fieldbus protocol in question, irrespective of whether the connection is via the fieldbus interface or a service interface of the field device. If, for example, communication takes place via the service interface of the field device, the corresponding fieldbus commands can be tunneled through the protocol of the communication interface.

Operation encompasses measures for the commissioning, diagnostics and maintenance of a field device, for instance. For this purpose, data must be read out of the field device and visualized, for instance. Furthermore it may also be necessary to change parameters of the field device.

Currently, however, this is only possible if appropriate DTMs, as mentioned above, or other drivers, particularly protocol drivers, for the field device are available in the operating device itself.

In addition, the aforementioned communication stack is often intermeshed with the firmware or another part of a software application used to operate the field device, such as the firmware, such that it is hardly feasible to replace or add to the communication stack.

SUMMARY OF THE INVENTION

The problem addressed by the invention is that of enabling the operation of a field device, particularly in such a way that does not require an appropriate protocol driver to be available on the operating device, for example.

According to the invention, the problem is solved by a method for operating a field device, an arrangement comprising a higher-order unit, an operating device and a field device, a client application and a server application.

With regard to the method for operating a field device, the problem is solved by a method for operating a field device, wherein at least one command that is in line with a communication protocol for operating a field device is sent from a higher-order unit to a field device by sending the command to an operating unit by means of a first bearer protocol and by transmitting the command from the operating unit to the field device by means of a second bearer protocol.

A field device, particularly a field device used in process automation engineering, is understood to be any device used in an industrial facility, such as a sensor, an actuator, a display unit or also a gateway or a wireless adapter etc.

Operation comprises, for instance, data transmission from and/or to the field device. In particular, an operation to change parameter settings of a field device can also be understood as operation.

The first bearer protocol, which is, for example an Internet protocol, is then used to transmit a command from the higher-order unit to the field device. The higher-order unit can have an appropriate memory in which the commands are stored in the form of a protocol driver. In this way, an appropriate memory does not need to be present in the operating device.

Multiple commands can, of course, be transmitted from the higher-order unit to the operating device by means of the first bearer protocol. Similarly, it is possible that the at least one command is not only transmitted from the higher-order unit to the operating unit by means of one bearer protocol but by means of multiple bearer protocols. The bearer protocols here can be nested within one another or can be used to transmit the command via a specific communication connection.

This at least one command transmitted to the operating device is then transmitted by the operating device to the field device by means of a second bearer protocol. The information and statements provided above for the first bearer protocol also apply for the second bearer protocol.

Therefore, the operating device can have a first communication connection, for example, and a corresponding first interface which is used for communication with the higher-order unit. Furthermore, a second communication connection can be provided between the operating device and the field device. To this end, the operating device can have an appropriate second communication interface. In particular, the first and the second communication interface of the operating device are diverse communication interfaces that exchange data in accordance with different protocols.

The field device can then itself have a communication interface that is connected to the operating device via the second communication connection.

In this way, the field device can be operated from the higher-order unit. Therefore, the operating device does not need to contain field device-specific information that is used for the operation of the field device. In particular, there is no longer a need for a specific protocol driver, which is used to operate the field device, to be provided on the operating device. The commands in question can be sent from the higher-order unit and transmitted to the field device via the operating device.

In one embodiment of the method, a communication channel is formed between an application on the server and the field device by means of the first and second bearer protocol. Preferably, an application can be provided on the higher-order unit to transmit the commands from the higher-order unit to the field device. The commands can be saved in this unit. In particular, one or more applications, for example modules, can be provided which are used to provide commands in accordance with different protocols, particularly fieldbus protocols. Therefore, a communication channel that acts as a tunnel for the commands can be provided between the higher-order unit and the field device.

The tunnel extends over a first transmission path, which is bridged by means of the first bearer protocol, and over a second transmission path, which is bridged by means of the second bearer protocol.

In another embodiment of the method, the first bearer protocol is used for data exchange via a first communication connection between the higher-order unit and the operating device. The first communication connection is preferably a wireless connection, such as a mobile Internet connection.

As already explained at the start, communication with a field device requires the use of certain commands of a communication protocol. For this purpose, in particular, a communication stack—preferring precisely one communication stack—that interprets the commands in question can be provided in the field device. This communication stack can, for example, then be used to process commands received via a fieldbus interface of the field device and commands received via the communication interface for communication with the operating device.

A higher-order unit here can be any data processing unit that has a communication link with the operating device, preferably a computer.

In another embodiment of the method, the second bearer protocol is used for data exchange via a second communication connection between the operating device and the field device. The second communication connection can also to be a wireless communication connection. Having said that, given the often close proximity between the operating device and the field device it is also possible for the second communication connection to be a wired connection (directly between the operating device and field device).

In a further embodiment of the method, the communication protocol is a fieldbus protocol. The commands that are transmitted by means of the first and second bearer protocol to the field device via the first and second communication connection belong to a fieldbus protocol.

In a further embodiment of the method, the higher-order unit is a server. The server can, for example, be provided on a computer and be connected to the operating device via the first communication connection.

In a further embodiment of the method, the commands transmitted by the server are initiated by means of the operating device. This means that the field device is to be operated from the operating device. In this situation, a connection is established with the higher-order unit by means of an application on the operating device. Via this connection, via which communication takes place by means of the first bearer protocol, a request for field device operation is sent from the application on the operating device to the application on the higher-order unit. For this purpose, appropriate requests can be defined between the application on the operating device and the application in the higher-order unit. The application then translates the request or requests to one or more commands that can be processed by the field device.

In a further embodiment of the method, the field device is operated by means of a client application on the operating device in that the client application on the operating device communicates with the server application on the higher-order unit. The aforementioned application on the operating device can be a client application that communicates with the application on the higher-order unit, said application here being a server.

In another embodiment of the method, a field device identifier is determined by means of an operating device via a first communication connection to the field device and by means of a bearer protocol which is used to exchange data between the field device and the operating device via the communication connection. On the basis of the field device identifier, which is for example the serial number, or similar, of the field device, it is possible to determine the architecture of the field device using data from a database, for example, such as the electronic fittings, the functions that are available, and the particular fieldbus protocol via which the field device can be operated. This identifier can be implemented by means of an identification of the field device using commands of the second bearer protocol.

In another embodiment of the method, the operating device does not have a protocol driver or does not have the suitable protocol driver for communicating with the field device in accordance with the communication protocol. The operating device, or the application on the operating device, particularly the client application, has at least one protocol driver for the first communication connection and a protocol driver for the second communication connection.

In another embodiment of the method, a protocol driver is provided on the higher-order unit for communicating with the field device in accordance with the communication protocol. As already mentioned, several protocol drivers can also be provided on the higher-order unit, and/or the higher-order unit can have multiple protocol drivers. The protocol driver that is suitable for operation can be determined using the identifier for the field device.

The problem is also solved by a method for operating a field device, wherein an operating menu structure, which is adapted to the display unit of an operating device by the higher-order unit, is transmitted to the operating device for the purpose of operating the field device. In addition, given that an operating program for operating a field device does not need to be developed and adapted for every possible display unit and every possible operating system, the higher-order unit can create or pre-edit an operating menu structure which is shown on a display unit of the operating device. In this way, an operating menu structure which is adapted to the particular operating unit, taking into account the size of the display unit or the display unit's resolution, can be created and transmitted to the operating device for display.

With regard to the arrangement, the problem is solved by an arrangement comprising a higher-order unit, an operating device and a field device for implementing the method as described in one of the previous embodiments.

With regard to the client application, the problem is solved by a client application for use in the method as described in one of the previous embodiments.

With regard to the server application, the problem is solved by a server application for use in the method as described in one of the previous embodiments.

BRIEF DESCRIPTION OF THE DRAWINGS

The invention is explained in more detail on the basis of the following drawings.

FIG. 1 shows a schematic representation of an arrangement for the operation of a field device, comprising a field device, an operating device and a higher-order unit.

DETAILED DISCUSSION IN CONJUNCTION WITH THE DRAWINGS

FIG. 1 shows a schematic representation of a field device FG that is connected to a fieldbus FB, an operating device BG for operating the field device FG, and a higher-order unit UE.

Nowadays, field devices used in process automation are operated either via an operating interface directly on the field device FG, such as via a display and/or keys, or via an operating device, such as a laptop, on which appropriate device drivers, e.g. DDs, DTMs, are installed.

Operation here encompasses tasks for commissioning, diagnostics and maintenance. For this purpose, data must be read out of the field device FG and visualized, and parameters of the field device FG changed. Due to the development of smart phones, tablets and similar devices, there is the desire to also use these devices to operate field devices on site. These different mobile devices have different form factors, such as the display size, and different operating elements, such as buttons, touchscreen, etc., and use different operating systems, such as iOS, Android. However, one problem is that appropriate applications, or apps, need to be developed for each of these mobile devices, said apps depicting the field-device-specific data and functions in order to enable the operation of a certain type of field device. Alternatively, an app would need to be able to integrate and run device-specific drivers, e.g. DDs. Another problem with regard to the on-site operation of a field device FG is the synchronization of the field device data with the central data pool in the facility, e.g. in an asset management system.

The embodiment as shown in FIG. 1 consists of the following elements:
- a field device FG with a communication interface (wired or wireless);
- a mobile operating device BG, such as a smartphone, a tablet, a notebook or a PC, etc. with a generic application (app) for device operation;
- a web server WS with device data administration DB and device functions f, said device functions f being available for mobile operating devices BG via web services;
- a communication connection K2 between the mobile operating device BG and the field device FG; and
- communication connection K1 between the mobile operating device BG and web server WS.

The method for operating the field device can, for example, comprise one or more of the following steps:

1) The mobile operating device BG establishes a connection with the web server WS via the first communication connection K1 by means of the first bearer protocol. This takes place, for example, via a mobile wireless connection such as GSM or 4G, for example.

2) As an option, a user must identify himself/herself at the server WS with his/her operating device BG. The server WS verifies the user name and password and an identifier of the mobile operating device. Following successful verification, the user receives clearance for certain field devices, data and functions. The user can therefore work with the field device FG, data and functions via the server WS.

3) Using the mobile operating device BG, a second communication connection K2 is established on site with the field device FG by means of the second bearer protocol. This connection K2 can be established via a service interface of the field device FG, such as a CDI interface, or via a wireless interface, such as Bluetooth or Bluetooth-LE.

4) The field device FG is identified using certain features that are read out of the field device FG. The user confirms that he wishes to work with this field device. If there are several field devices FG in the vicinity and these can be identified by the mobile operating device BG, the user can select a field device FG that he/she now wishes to operate.

5) For example, the mobile operating device BG can request the menu structure and the data of the field device FG from the web server WS. The web server WS communicates with the field device FG via the communication channel—comprising the communication connections K1, K2—that was established with the mobile operating device BG, reads the necessary data out of field device FG and sends the data to the mobile operating device BG. The structure of the data is then adapted for the mobile operating device BG in the server WS. This means that a smart phone with a relatively small display only receives, for example, the content of one menu item, while a notebook can display several menu items at once and therefore receives the data with a different structure and more data at once.

6) Optionally, the structure of the data, such as the menu structure of the field device FG, is displayed in the generic application (app) in a way that is adapted to the mobile operating device BG (rendering). Here, the operating elements that are available on this operating device are used.

7) The user can now change a field device parameter by means of the operating device BG, such as by making an entry at the operating device BG. The modified value is sent to the server WS, where it is validated, for example, and then sent from the server WS to the field device FG via the communication channel K1 and K2. Here, a command known to the field device FG is used, such as a command in accordance with the fieldbus protocol of the fieldbus FB. In particular, this modified value is not processed further by the operating device BG when transmitted from the higher-order unit UE to the field device FG. In this case, the operating device is only used to transfer the modified value from and to the field device.

With regard to the communication interface, interfaces of the field device FG that are already available are considered, such as the service interface or an interface via a standardized wireless interface, such as Bluetooth-LE, with a simple protocol for identifying the field device and establishing a communication channel.

The web server WS described can be an FDI server, for instance. With regard to data transmission to the mobile operating device BG, HTML5 or XAML can be used as the bearer protocol.

The data and functions that are required to operate a field device FG are separate from the display and operation on a specific mobile operating device BG. Field device drivers no longer need to be installed on the mobile operating device BG. The mobile operating device BG no longer needs to know the specific data and functions of a field device FG. A general communication protocol that allows a communication channel to be established with the field device FG via K1 and K2 suffices for communication with the field device FG.

The protocol, which may be specific to the field device, does not need to know the mobile operating device BG. The associated protocol driver can be accommodated in the web server WS. Given these advantages, it is relatively easy to support different types of mobile operating devices BG. Another advantage is that all the modifications that are made to a field device FG onsite can be synchronized at any time with the central device data management system via the server.

In principle, the present invention can be used for all field devices FG of a particular vendor, such as Endress+Hauser for example. However, it is also conceivable that the present invention is also used for field devices and operating devices of other vendors.

The invention claimed is:

1. A method for operating a field device of process automation, wherein the field device is a sensor or an actuator, comprising the steps of:

establishing a communication channel that acts as a tunnel for commands between a higher-order unit and said field device by an operating device, wherein the higher-order unit is a server provided on a computer, wherein the operating device is a laptop, a PC, a smart phone or a tablet and wherein said tunnel extends over a first transmission path, which is bridged by means of a first bearer protocol, and over a second transmission path, which is bridged by means of a second bearer protocol;

transmitting at least one command in accordance with a communication protocol for the operation of said field device from said higher-order unit to said field device, wherein:

said at least one command is transmitted to said operating device by means of said first bearer protocol; and said at least one command is then further transmitted from said operating device to said field device by means of said second bearer protocol.

2. The method as claimed in claim 1, wherein:
a communication channel is formed between an application on a server and the field device by means of the first and second bearer protocol.

3. The method as claimed in claim 1, wherein:
the first bearer protocol is used for data exchange via a first communication connection between the higher-order unit and the operating device.

4. The method as claimed in claim 1, wherein:
the second bearer protocol is used for data exchange via a second communication connection between the operating device and the field device.

5. The method as claimed in claim 1, wherein:
the communication protocol is a fieldbus protocol.

6. A method as claimed in claim 1, wherein:
the higher-order unit is a server and/or an application on the server.

7. The method as claimed in claim 1, wherein:
the commands transmitted by the server are initiated by means of the operating device.

8. The method as claimed in claim 1, wherein:
the field device is operated by means of a client application on the operating device in that the client application on the operating device communicates with the server application on the higher-order unit.

9. The method as claimed in claim 1, wherein:
a field device identifier is determined by means of an operating device via a first communication connection to the field device and by means of a bearer protocol which is used to exchange data between the field device and the operating device via the communication connection.

10. The method as claimed in claim 1, wherein:
the operating device does not have a protocol driver or does not have the suitable protocol driver for communicating with the field device in accordance with the communication protocol.

11. The method as claimed in claim 1, wherein:
a protocol driver is provided on the higher-order unit for communicating with the field device in accordance with the communication protocol.

12. The method as claimed in claim 1, wherein:
an operating menu structure, which is adapted to the display unit of an operating device, is transmitted to the operating device by the higher-order unit for the purpose of operating the field device.

13. An arrangement comprising:
a higher-order unit, an operating device, and a field device for implementing the method as claimed in claim 1.

14. Client application for use in the method as claimed in claim 1.

15. Server application for use in the method as claimed in claim 1.

16. The method as claimed in claim 1, wherein:
said communication channel consists of said first transmission path and of said second transmission path.

* * * * *